(12) United States Patent
Seppala

(10) Patent No.: US 8,180,342 B2
(45) Date of Patent: May 15, 2012

(54) SYSTEM, METHOD AND COMPUTER PROGRAM PRODUCT FOR DELIVERING A SERVICE GUIDE OF A FIRST BROADCAST/MULTICAST SYSTEM AS A PROGRAM OF A SECOND BROADCAST/MULTICAST SYSTEM

(75) Inventor: Martta Seppala, San Diego, CA (US)

(73) Assignee: Nokia Corporation, Espoo (FI)

( * ) Notice: Subject to any disclaimer, the term of this patent is extended or adjusted under 35 U.S.C. 154(b) by 857 days.

(21) Appl. No.: 11/548,438

(22) Filed: Oct. 11, 2006

(65) Prior Publication Data

US 2007/0127476 A1 Jun. 7, 2007

Related U.S. Application Data

(60) Provisional application No. 60/726,572, filed on Oct. 14, 2005.

(51) Int. Cl.
*H04W 4/00* (2009.01)
*H04L 9/08* (2006.01)

(52) U.S. Cl. ............... 455/432.1; 455/422.1; 455/432.2; 380/278

(58) Field of Classification Search ................ 455/432.1
See application file for complete search history.

(56) References Cited

U.S. PATENT DOCUMENTS

2006/0030312 A1* 2/2006 Han et al. .................... 455/432.1
2007/0093202 A1* 4/2007 Hwang et al. ................ 455/3.06

FOREIGN PATENT DOCUMENTS

| EP | 1 708 392 A2 | 10/2006 |
|---|---|---|
| EP | 1708393 | 10/2006 |
| KR | 10-2005-0017046 | 2/2005 |
| KR | 10-2005-0057090 | 6/2005 |

OTHER PUBLICATIONS

Mobile Broadcast Services Architecture Draft Version 1.0-05 May 2005.*
International Search Report for PCT Application No. PCT/IB2006/002970; Filed Oct. 12, 2006; Date of Completion Apr. 10, 2007; Date of Mailing Apr. 13, 2007.
Written Opinion for PCT Application No. PCT/IB2006/002970; Filed Oct. 12, 2006; Date of Completion Apr. 10, 2007; Date of Mailing Apr. 13, 2007.
"*Advances in Mass Media Delivery to Mobiles*," MIPS2004 Tutorial; Multimedia Interactive Protocols and Systems Workshop; pp. 1-6, pp. 69-74 and pp. 96-97; Nov. 16-19, 2004; Grenoble, France http://mips2004.imag.fr/files/MIPS2004-MMM_tutorial.pdf.
M.Gross; "*Instinct*," Update on Deliverable 1.1; Mar. 21, 2005 http://dea.brunel.ac.uk/instinct/docs/wp1-039_publicdocs.pdf.

(Continued)

*Primary Examiner* — Charles Appiah
*Assistant Examiner* — Natasha Cosme
(74) *Attorney, Agent, or Firm* — Ditthavong Mori & Steiner, P.C.

(57) ABSTRACT

An apparatus is provided which includes a server of a first broadcast/multicast system and an adaptation function. The adaptation function provides communication between the server of the first broadcast/multicast system and a server of a second broadcast/multicast system. The adaptation function is configured to envelop at least one content item of the second broadcast/multicast system within a program of the first broadcast/multicast system.

23 Claims, 4 Drawing Sheets

OTHER PUBLICATIONS

"*Mobile Broadcast Open Air Interface 1.0*"; Aug. 2005 http://www.mobiletv.nokia.com/solutions/openair/files/oai_v1_02.pdf.

"*SG Discovery for BCMS Adaptation*," Change Request; Open Mobile Alliance; Dec. 8, 2005 http://member.openmobilealliance.org//ftp/public_docments/bcast/2005/.

Korean Office Action for corresponding KR Application No. 10-2008-7008797, Aug. 4, 2009, pp. 1-12.

Hartung, F.: Content and Service Protection for Mobile Broadcast Services. Multiradio Multimedia Communications 2005, Jan. 14, 2005, XP002556557, pp. 1-6.

Paila, T.: Enabling Globally Interoperable Mobile Broadcast Service. Multiradio Multimedia Communications 2005, Jan. 14, 2005, XP002556556, pp. 1-10.

Service Guide for Mobile Broadcast Services. Open Mobile Alliance Ltd., Draft Version 1.0, Aug. 5, 2005, XP002443794, pp. 1-49.

Supplementary European Search Report, PCT/IB2006002970, Dec. 18, 2009, pp. 1-7.

* cited by examiner

SYSTEM, METHOD AND COMPUTER PROGRAM PRODUCT FOR DELIVERING A SERVICE GUIDE OF A FIRST BROADCAST/MULTICAST SYSTEM AS A PROGRAM OF A SECOND BROADCAST/MULTICAST SYSTEM

CROSS REFERENCE TO RELATED APPLICATION

This application claims the benefit of U.S. Provisional Application No. 60/726,572, filed Oct. 14, 2005, the contents of which are incorporated herein in their entirety.

TECHNOLOGICAL FIELD

Embodiments of the present invention generally relate to mobile broadcast services and, in one exemplary embodiment, to systems and methods for delivering OMA Mobile Broadcast Services (OMA BCAST) content via Broadcast and Multicast Service (BCMCS).

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One such delivery technique that has shown promise is Digital Video Broadcasting (DVB). In this regard, DVB-T, which is related to DVB-C (cable) and DVB-S (satellite), is the terrestrial variant of the DVB standard. As is well known, DVB-T is a wireless point-to-multipoint data delivery mechanism developed for digital TV broadcasting, and is based on the MPEG-2 transport stream for the transmission of video and synchronized audio. DVB-T has the capability of efficiently transmitting large amounts of data over a broadcast channel to a high number of users at a lower cost, when compared to data transmission through mobile telecommunication networks using, e.g., 3G systems. Advantageously, DVB-T has also proven to be exceptionally robust in that it provides increased performance in geographic conditions that would normally affect other types of transmissions, such as the rapid changes of reception conditions, and hilly and mountainous terrain. On the other hand, DVB-H (handheld), which is also related to DVB-T, can provide increased performance particularly for wireless data delivery to handheld devices.

As evidenced by DVB, digital broadband data broadcast networks are known. In this regard DVB networks enjoy popularity in Europe and elsewhere for the delivery of television content as well as the delivery of other data, such as Internet Protocol (IP) data. Other examples of broadband data broadcast networks include Japanese Terrestrial Integrated Service Digital Broadcasting (ISDB-T), Digital Audio Broadcasting (DAB), and Multimedia Broadcast Multicast Service (MBMS), and those networks provided by the Advanced Television Systems Committee (ATSC). In many such systems, program guides have been developed to deliver services to users over the digital broadband data broadcast networks. One such program guide is a Broadcast and Multicast Service (BCMCS). BCMCS allows users to receive a variety of content (e.g. video/text) via mobile terminals in a wireless network. BCMCS may be employed, for example, in a Third Generation Partnership Project 2 (3GPP2) environment. Other similar services are being developed for Third Generation Partnership Project (3GPP) and Open Mobile Alliance (OMA), for example. Users may subscribe to BCMCS service, in which a controller responds to user requests for content information over an IP network. A user selects desired content via the BCMCS program guide at their mobile terminals. The controller may then authenticate the user's request and provide the selected content if appropriately authenticated.

There has been a recent demand for services related to mobile broadcasts. In response to such demand, OMA Mobile Broadcast Services (OMA BCAST) have been developed. An OMA BCAST service guide provides functionality allowing a user to select mobile broadcast services including, for example, interactive services, location based broadcasting, and purchasing and subscribing information. It is possible to partly map XML attributes of the OMA BCAST service guide into the BCMCS program guide. However, the OMA BCAST service guide is much more complex and advanced than the BCMCS program guide and thus, functionalities of the OMA BCAST service guide cannot be stripped down to permit operation with the BCMCS service. Instead, certain functionalities of the OMA BCAST service guide are lost in instances in which the OMA BCAST service guide is delivered via BCMCS. Furthermore, the BCMCS program guide is currently the only way to offer OMA BCAST services via BCMCS. The BCMCS program guide offers a mechanism for information flow, receiver IP address, etc. for creating a link between a server and a mobile terminal via BCMCS. Accordingly, a solution is desired to permit delivery of a complete OMA BCAST service guide and OMA BCAST services over BCMCS.

SUMMARY OF THE INVENTION

In light of the foregoing background, embodiments of the present invention provide a computer program product, system and method for delivering open mobile alliance broadcast services (OMA BCAST) content via broadcast-multicast services (BCMCS). In accordance with the computer program product, system and method of embodiments of the present invention, an OMA BCAST service guide or service may be tunneled or enveloped as a BCMCS program for display at a mobile terminal, thereby potentially retaining much, if not all, of the functionality of the OMA BCAST service guide or service.

According to one aspect of the present invention, a method for delivering OMA BCAST to a mobile terminal via BCMCS is provided. The method includes subscribing to a BCMCS service at a mobile terminal, requesting an OMA BCAST service guide via an adaptation function in communication between a BCMCS server and a OMA BCAST server, receiving the OMA BCAST service guide via the adaptation function, and displaying the OMA BCAST service guide via the BCMCS service.

According to one exemplary embodiment, a method and computer program product are provided which includes multiple operations or executable code portions. The first operation or executable code portion is for subscribing to a service in a first broadcast/multicast system at the mobile terminal. The second operation or executable code portion is for requesting a service guide from a second broadcast/multicast system via an adaptation function in communication between a server of the first broadcast/multicast system and a server of the second broadcast/multicast system. The third operation or executable code portion is for receiving the service guide as an enveloped content item of the second broadcast/multicast system within a program of the first broadcast/multicast system via the adaptation function. The fourth operation or executable code portion is for displaying the service guide of the second broadcast/multicast system via the first broadcast/multicast system.

According to another exemplary embodiment, an apparatus is provided which includes a server of a first broadcast/multicast system and an adaptation function. The adaptation function provides communication between the server of the first broadcast/multicast system and a server of a second broadcast/multicast system. The adaptation function is configured to envelop at least one content item of the second broadcast/multicast system within a program of the first broadcast/multicast system.

According to yet another exemplary embodiment, a system is provided which includes a server of a first broadcast/multicast system in communication with a mobile terminal, a server of a second broadcast/multicast system having at least one content item of the second broadcast/multicast system, and an adaptation function. The adaptation function provides communication between the server of the first broadcast/multicast system and the server of the second broadcast/multicast system. The adaptation function is configured to envelop the at least one content item within a program of the first broadcast/multicast system.

According to still another exemplary embodiment, an apparatus is provided which includes means for subscribing to a service in a first broadcast/multicast system at the mobile terminal, means for requesting a service guide from a second broadcast/multicast system via an adaptation function in communication between a server of the first broadcast/multicast system and a server of the second broadcast/multicast system, means for receiving the service guide as an enveloped content item of the second broadcast/multicast system within a program of the first broadcast/multicast system via the adaptation function, and means for displaying the service guide of the second broadcast/multicast system via the first broadcast/multicast system.

According to another exemplary embodiment, an apparatus comprising an adaptation function is provided. The adaptation function may provide communication between a server of a first broadcast/multicast system and a server of a second broadcast/multicast system. The adaptation function may be configured to envelop or tunnel at least one content item of the second broadcast/multicast system within a program of the first broadcast/multicast system.

According to another exemplary embodiment, a method and computer program product are provided which include multiple operations and executable code portions, respectively. The first operation or executable code portion is for receiving a subscription message indicative of a subscription by a mobile terminal to a service in a first broadcast/multicast system. The second operation or executable code portion is for communicating the subscription message to a second broadcast/multicast system. The third operation or executable code portion is for enveloping a service guide of the second broadcast/multicast system within a program of the first broadcast/multicast system.

BRIEF DESCRIPTION OF THE DRAWINGS

Figure 1:
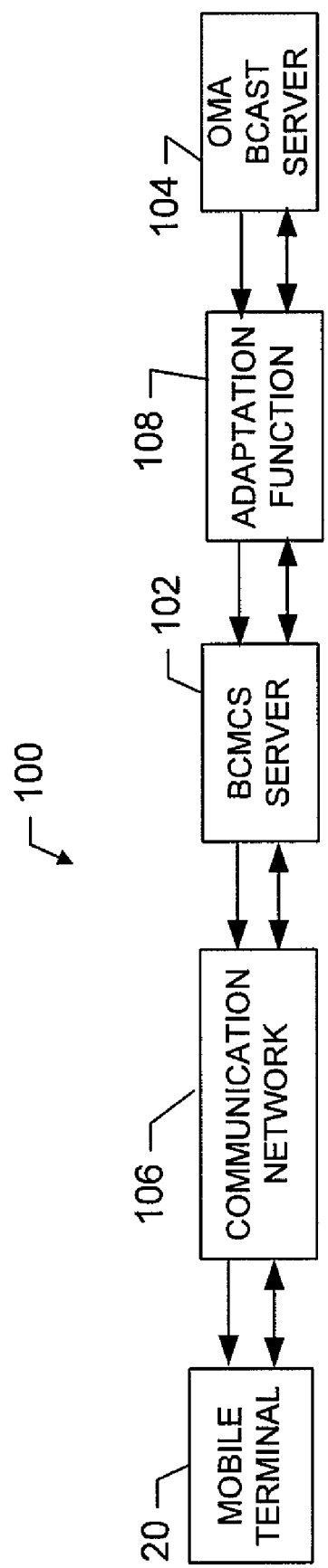
Figure 2:
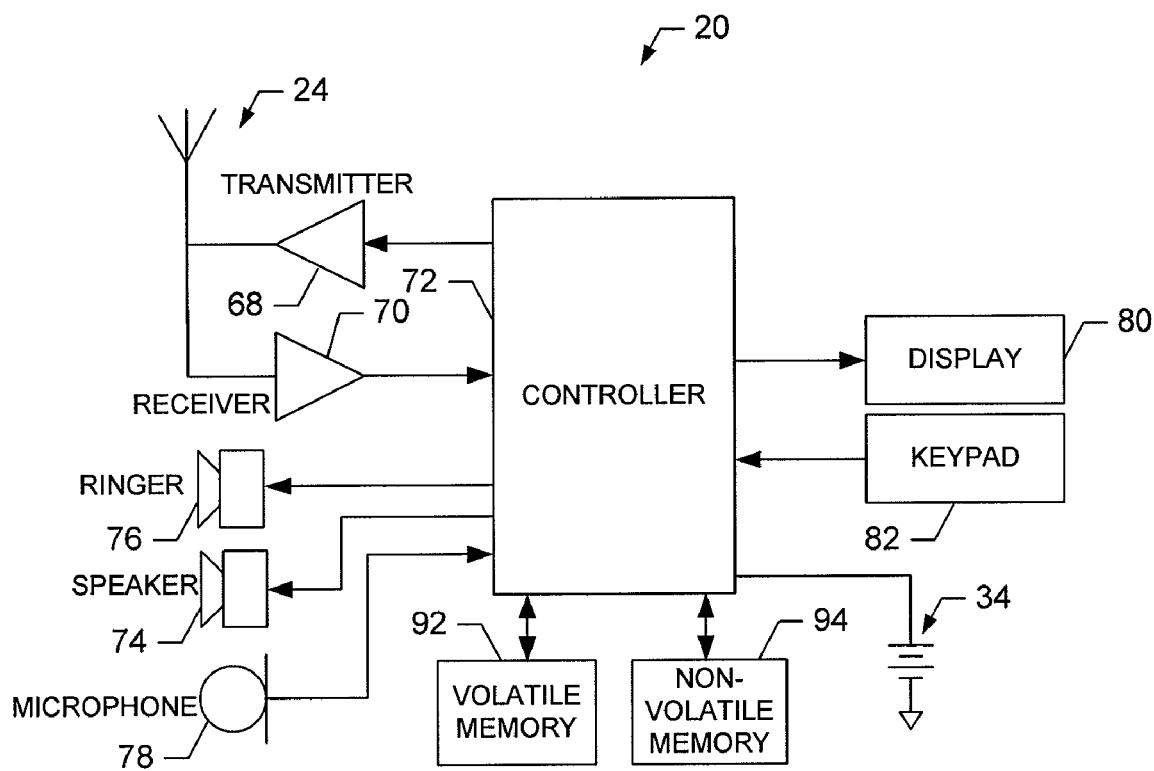
Figure 3:
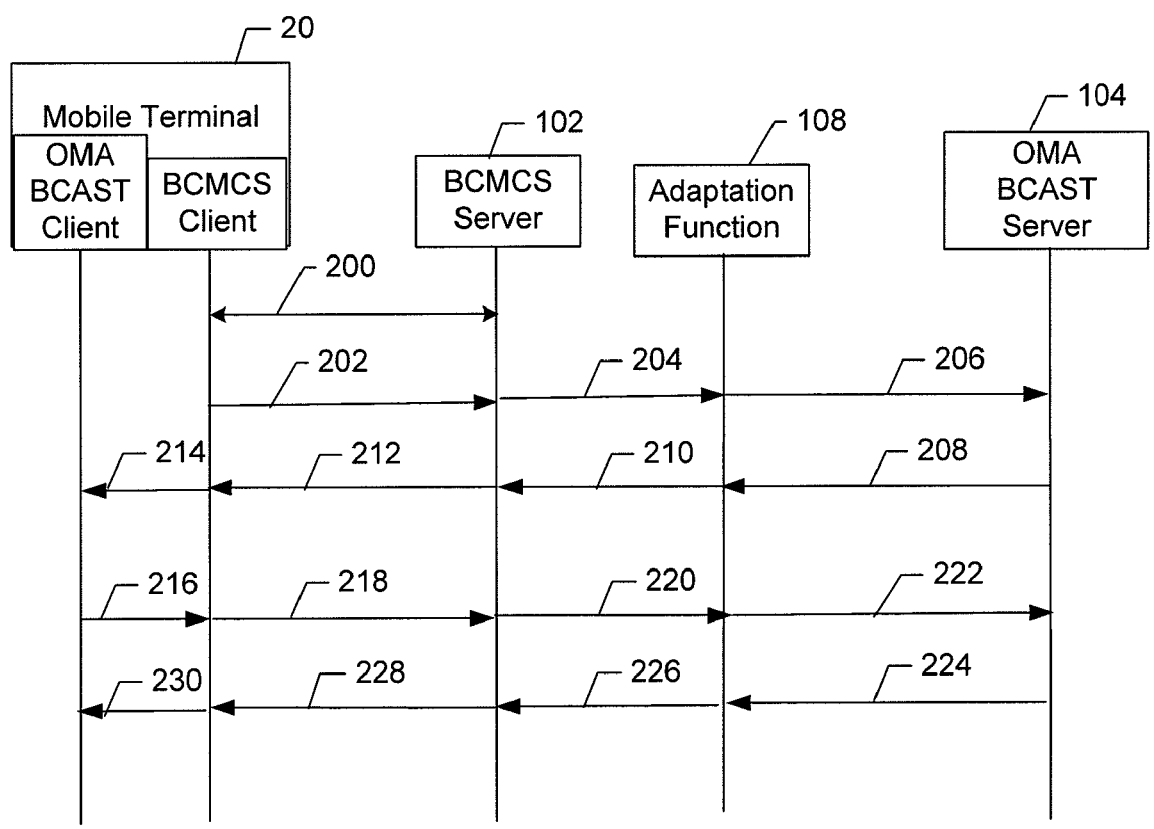
Figure 4:
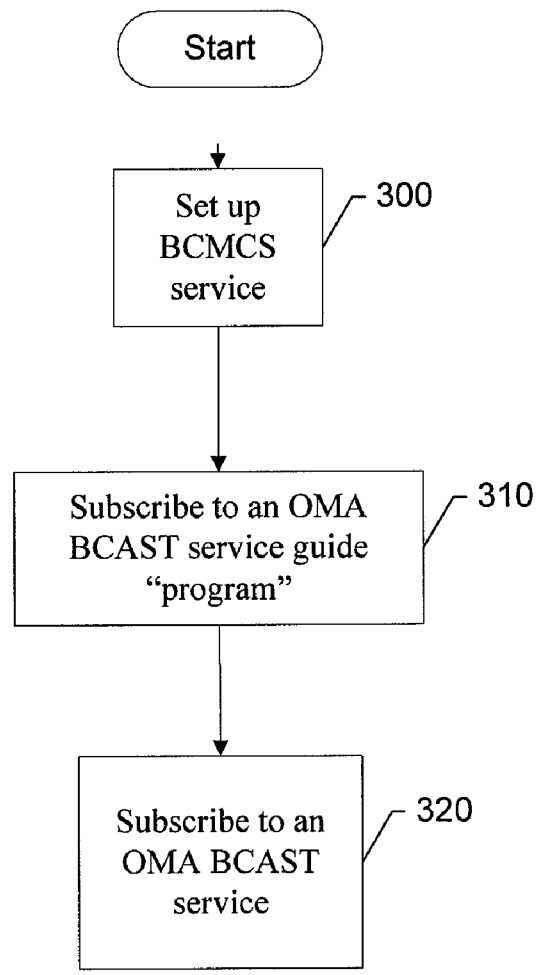

Having thus described the invention in general terms, reference will now be made to the accompanying drawings, which are not necessarily drawn to scale, and wherein:

FIG. 1 is a schematic block diagram of a wireless communications system according to an exemplary embodiment of the present invention;

FIG. 2 is a schematic block diagram of a mobile terminal according to an exemplary embodiment of the present invention;

FIG. 3 illustrates a control flow diagram according to a method of delivering OMA BCAST content via BCMCS, in accordance with an exemplary embodiment of the present invention; and FIG. 4 is a flowchart of methods, systems and program products, in accordance with an exemplary embodiment of the present invention.

DETAILED DESCRIPTION

Embodiments of the present invention will now be described more fully hereinafter with reference to the accompanying drawings, in which exemplary embodiments of the invention are shown. Embodiments of this invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 is a schematic block diagram of a system 100 for delivering Open Mobile Alliance Mobile Broadcast Services (OMA BCAST) content via Broadcast-Multicast service (BCMCS), in accordance with an exemplary embodiment of the present invention.

Referring now to FIG. 1, the system 100 includes a BCMCS server 102, an OMA BCAST server 104, a communication network 106 and an adaptation function 108. The BCMCS server 102 may include, for example, a BCMCS content server, a BCMCS controller and a BCMCS content provider. The BCMCS controller may be configured to communicate with BCMCS content providers either internal or external to the BCMCS server. In either instance, the BCMCS content providers are in operable communication with the BCMCS content server and the BCMCS controller. The BCMCS controller may also be configured to communicate with the mobile terminal 20 and direct the BCMCS content server to direct content from any of the BCMCS content providers to the mobile terminal 20. In an exemplary embodiment, the BCMCS controller may also communicate with authentication functions in either a home network of the mobile terminal 20 or a foreign network. BCMCS content may include a BCMCS program guide, which includes means for selecting BCMCS programs for either display or other use by the mobile terminal 20.

Reference is now made to FIG. 2, which illustrates one type of mobile terminal 20, which would benefit from embodiments of the invention. It should be understood, however, that the mobile terminal illustrated and hereinafter described is merely illustrative of one type of mobile terminal that would benefit from embodiments of the invention and, therefore, should not be taken to limit the scope of embodiments of the invention.

The mobile terminal 20 includes various means for performing one or more functions in accordance with exemplary embodiments of the invention, including those more particularly shown and described herein. It should be understood, however, that the mobile terminal may include alternative means for performing one or more like functions, without departing from the spirit and scope of embodiments of the invention. More particularly, for example, as shown in FIG. 2, in addition to an antenna 24, the mobile terminal 20 can include a transmitter 68, receiver 70, and controller 72 or other processor that provides signals to and receives signals from the transmitter and receiver, respectively. These signals include signaling information in accordance with the air interface standard of the applicable cellular system, and also user speech and/or user generated data. In this regard, the mobile terminal 20 can be capable of operating with one or more air interface standards, communication protocols, modulation types, and access types. More particularly, the mobile terminal 20 can be capable of operating in accordance with any of a number of first generation (1 G), second generation (2G), 2.5 G and/or third-generation (3G) communication protocols or the like. For example, the mobile terminal 20 may be capable of operating in accordance with 2 G wireless communication protocols IS-136 (TDMA), GSM, and IS-95 (CDMA). Also, for example, the mobile terminal 20 may be capable of operating in accordance with 2.5 G wireless communication protocols GPRS, EDGE, or the like. Further, for example, the mobile terminal 20 may be capable of operating in accordance with 3G wireless communication protocols such as CDMA2000 or UMTS network employing WCDMA radio access technology. Additionally, the mobile terminal 20 may be capable of operating in accordance with wide area network (WAN) communication protocols, such as WLAN (IEEE 802.11) or WiMAX (802.16). Some NAMPS, as well as TACS, mobile terminals 20 may also benefit from the teaching of embodiments of this invention, as should dual or higher mode phones (e.g., digital/analog or TDMA/CDMA/analog phones).

It is understood that the controller 72 includes the circuitry required for implementing the audio, video and logic functions of the mobile terminal 20. For example, the controller 72 may be comprised of a digital signal processor device, a microprocessor device, and various analog-to-digital converters, digital-to-analog converters, and other support circuits. The control and signal processing functions of the mobile terminal 20 are allocated between these devices according to their respective capabilities. The controller 72 may include the functionality to operate one or more client software programs such as those indicated above, which may be stored in memory (described below).

The mobile terminal 20 may also comprise a user interface including a conventional earphone or speaker 74, a ringer 76, a microphone 78, a display 80, and a user input interface, all of which are coupled to the controller 72. Although not shown, the mobile terminal 20 can include a battery 34 for powering the various circuits that are required to operate the mobile terminal 20, as well as optionally providing mechanical vibration as a detectable output. The user interface, which allows the mobile terminal 20 to receive data, can comprise any of a number of devices allowing the mobile terminal 20 to receive data, such as a keypad 82, a touch display (not shown), a joystick (not shown) or other input device.

The mobile terminal 20 can also include one or more means for sharing and/or obtaining data. For example, the mobile terminal 20 can include a short-range radio frequency (RF) transceiver or interrogator so that data can be shared with and/or obtained from electronic devices in accordance with RF techniques. The mobile terminal 20 can additionally, or alternatively, include other short-range transceivers, such as, for example an infrared (IR) transceiver, and/or a Bluetooth (BT) transceiver operating using Bluetooth brand wireless technology developed by the Bluetooth Special Interest Group. The mobile terminal 20 can therefore additionally or alternatively be capable of transmitting data to and/or receiving data from electronic devices in accordance with such techniques.

The mobile terminal 20 can further include memory, which typically stores information elements related to a mobile subscriber. In this regard, the mobile terminal 20 can include volatile memory 92, such as volatile Random Access Memory (RAM) including a cache area for the temporary storage of data. The mobile terminal 20 can also include other non-volatile memory 94, which can be embedded and/or may be removable. The memory can store any of a number of software applications, instructions, pieces of information, and data, used by the mobile terminal 20 to implement the functions of the mobile terminal 20.

The mobile terminal 20 is in communication with the BCMCS server 102 via the communication network 106. The communication network 106 may be a network operating any of the communication protocols described above. In an exemplary embodiment, the communication network 106 may include an IP based broadcast delivery network (e.g. 3GPP2) for delivering, for example, video broadcast services to the mobile terminal 20. The communication network 106 may also include an interaction channel (e.g. a cellular network) for providing interaction between the mobile terminal 20 and service provisioning functions of the OMA BCAST server 104. The service provisioning functions of the OMA BCAST server 104 may include, for example, service or content purchase and payment functions.

The OMA BCAST server 104 is in communication with the BCMCS server 102 via the adaptation function 108. The OMA BCAST server 104 provides functionality to authenticate requests to view OMA BCAST content or services via an OMA BCAST service guide. The OMA BCAST server 104 may then provide the OMA BCAST content or services, for example, following authentication of the request or payment for such content or services. The OMA BCAST server 104 may include further functionality to communicate with the BCMCS server 102 via the adaptation function 108 to negotiate parameters for data interface.

The adaptation function 108 may be a part of either the OMA BCAST server 104 or the BCMCS server 102. Alternatively, the adaptation function 108 may be a separate unit disposed at either the OMA BCAST server 104 or the BCMCS server 102. The adaptation function 108 may be embodied, for example, as a proxy or a router. Alternatively, the adaptation function 108 may be a different device performing a function similar to that of a proxy or a router by passing, for example, either the OMA BCAST service guide, file transfer, or broadcast data from the OMA BCAST server 104 to the BCMCS server 102. In an exemplary embodiment, the adaptation function 108 delivers OMA BCAST content inside the same "channel" as a BCMCS program and is proxyed behind one access. In other words, the adaptation function 108 acts as a proxy, or network address translation (NAT), since an OMA BCAST service may have several sources from different IP addresses. Thus, for example, if a BCMCS operator has allocated only one "program" space for the OMA BCAST service, the adaptation function 108 masks an entire OMA BCAST service or content behind one IP address. In effect, the adaptation function 108 performs a tunneling or enveloping of either a single OMA BCAST service, the OMA BCAST service guide, or an entire OMA BCAST service. Thus, for example, the OMA BCAST service guide is provided as a program on the BCMCS program guide. Once selected as a program to be provided via BCMCS, the OMA BCAST service guide may be viewed to select a particular OMA BCAST service. Once the particular OMA BCAST service is selected, the BCMCS server 102 provides the mobile terminal 20 with the particular OMA BCAST service from the adaptation function 108 again as a program of the BCMCS.

Reference is now made to FIG. 3, which illustrates a control flow diagram according to a method of delivering OMA BCAST content via BCMCS, in accordance with embodiments of the present invention. The BCMCS server 102 and the mobile terminal 20 perform a BCMCS service set up or subscription process at 200. In an exemplary embodiment, a BCMCS client application at the mobile terminal 20 may interface with the BCMCS server 102 for the BCMCS service subscription process 200. During the BCMCS service subscription process 200, the BCMCS server 102 provides a list of available programs to the BCMCS client at the mobile terminal 20. Such a subscription process is described in 3GPP2 document "Broadcast and Multicast Service in cdma2000 Wireless IP Network, Release A (to be subsequently distributed as X.S0022-A). One of the available programs provided to the mobile terminal 20 may be an enveloped or tunneled OMA BCAST service guide.

Selection of the OMA BCAST service guide initiates a subscription to an OMA BCAST service guide "program" at operations 202 through 214. In response to a user selecting the OMA BCAST service guide, the BCMCS client at the mobile terminal 20 sends a first BCMCS request to the BCMCS server 102. See operation 202. The first BCMCS request 202 includes a request to receive the OMA BCAST service guide. The BCMCS server 102 then sends a subscription message or request for the OMA BCAST service guide to the adaptation function 108. See operation 204. Communication between the adaptation function 108 and the OMA BCAST server 104 may include negotiation for parameters, etc. See operation 206. At 208 and 210, the OMA BCAST server 104 streams the OMA BCAST service guide to the BCMCS server 102 as a program via the adaptation function 108. Specifically, the adaptation function 108 tunnels or envelopes the OMA BCAST service guide as a BCMCS program. See operation 210. The adaptation function 108 may insert an OMA BCAST identifier to the streamed OMA BCAST service guide. For example, the adaptation function 108 may insert an OMA BCAST identifier such as "OMA BCAST v.1.0 identifier" to the OMA BCAST service guide delivery. At operation 212, the BCMCS server 102 sends a first BCMCS response to the mobile terminal 20. The first BCMCS response 212 may include the OMA BCAST service guide provided to the BCMCS client at the mobile terminal 20 as a BCMCS program. In an exemplary embodiment, the BCMCS client at the mobile terminal 20 receives the OMA BCAST service guide from the BCMCS server 102, recognizes the BCMCS program as the OMA BCAST service guide, and delivers the OMA BCAST service guide to an OMA BCAST client application at the mobile terminal 20 at operation 214.

Upon receipt of the OMA BCAST service guide by the OMA BCAST client, the mobile terminal 20 may display the OMA BCAST service guide to the user. The user may then select a particular OMA BCAST service, which may or may not require additional subscription. The OMA BCAST client may then send a subscription message or request for an OMA BCAST service to the BCMCS client at operation 216. The BCMCS client then provides a second BCMCS request to the BCMCS server 102 at operation 218. The second BCMCS request 218 includes a request for the OMA BCAST service. At operation 220, the BCMCS server 102 sends a subscription message or request for the OMA BCAST service to the adaptation function 108, which forwards the request to the OMA BCAST server 104 at 222. The OMA BCAST server 104 then provides the OMA BCAST service to the BCMCS server 102 via the adaptation function 108 at operations 224 and 226. Specifically, the adaptation function 108 tunnels or envelopes the OMA BCAST service as a BCMCS program at operation 226. The BCMCS server 102 then provides a second BCMCS response to the mobile terminal 20 at operation 228. In an exemplary embodiment, the second BCMCS response 228 includes the OMA BCAST service which is streamed to the BCMCS client at the mobile terminal 20. The BCMCS client then streams the OMA BCAST service to the OMA BCAST client at the mobile terminal 20.

As an alternative to the above described embodiments, the OMA BCAST service guide may be partly mapped. In other words, access information (e.g. IP address and port number information) given to the OMA BCAST service guide "program" by the BCMCS server 102 may be the same as that of the OMA BCAST service guide delivered to the adaptation function 108. Alternatively, session description data may be mapped from OMA BCAST into BCMCS or vice versa.

In this regard, FIG. 4 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowchart. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowchart. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowchart.

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Referring now to FIG. 4, a method of delivering OMA BCAST via BCMCS according to an exemplary embodiment is provided. Setting up BCMCS service occurs at operation 300. Subscribing to the OMA BCAST service guide program occurs at operation 310. The subscribing to the OMA BCAST service guide program includes sending and receiving of the first BCMCS request and the first BCMCS response, respectively. Subscribing to the OMA BCAST service occurs at operation 320. The subscribing to the OMA BCAST service includes sending and receiving of the second BCMCS request and the second BCMCS response, respectively. Tunneling of either the OMA BCAST service guide and the OMA BCAST service occur as operations 310 and 320, respectively.

For example, a method according to an exemplary embodiment of the claimed invention may include an initial operation of subscribing to a service in a first broadcast/multicast system at the mobile terminal. A service guide may then be requested from a second broadcast/multicast system via an adaptation function in communication between a server of the first broadcast/multicast system and a server of the second broadcast/multicast system. The service guide of the second broadcast/multicast system may then be enveloped as a content item within a program of the first broadcast/multicast system. The service guide may then be received from the second broadcast/multicast system at the mobile terminal via the adaptation function. The service guide of the second broadcast/multicast system may then be displayed via the service of the first broadcast/multicast system. A user may then request a broadcast service of the second broadcast/multicast system from the service guide via the adaptation function. The broadcast service may then be received enveloped within another program of the first broadcast/multicast system via the adaptation function.

It should be noted that although the above described embodiments describe tunneling or enveloping an OMA BCAST service guide or service in a BCMCS program guide, the above described principles apply more generally to a situation where a first type of service is desired to be provided via a second type of service. Thus, the OMA BCAST and BCMCS are simply exemplary services with which embodiments of the present invention may be practiced and should not be construed to limit the principles disclosed above. Examples of other services with which embodiments of the present invention may be practiced include forward link only (FLO) and MediaFLO.

Many modifications and other embodiments of the invention will come to mind to one skilled in the art to which embodiments of this invention pertains having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
 causing, at least in part, subscription to a service in a first broadcast/multicast system, comprising a Broadcast and Multicast System (BCMCS), for a mobile terminal;
 causing, at least in part, transmission from the mobile terminal a request for a service guide of a second broadcast/multicast system, comprising an open mobile alliance broadcast/multicast system (OMA BCAST), via an adaptation function between the first broadcast/multicast system and the second broadcast/multicast system, the first broadcast/multicast system being different from the second broadcast/multicast system;
 causing, at least in part, reception at the mobile terminal at least a portion of the service guide of the second broadcast/multicast system as an enveloped content item within a program of a service guide of the first broadcast/multicast system via the adaptation function; and
 causing, at least in part, displaying at the mobile terminal the at least a portion of the service guide of the second broadcast/multicast system received via the first broadcast/multicast system.

2. The method of claim 1, further comprising requesting a broadcast service of the second broadcast/multicast system from the service guide via the adaptation function.

3. The method of claim 2, further comprising receiving a subscription to the requested broadcast service via the adaptation function.

4. The method of claim 2, further comprising receiving the broadcast service enveloped within another program of the first broadcast/multicast system via the adaptation function.

5. The method of claim 4, wherein receiving the broadcast service comprises receiving content of the second broadcast/multicast system inside the same channel as the program of the first broadcast/multicast system proxyed behind one access.

6. The method of claim 1, wherein receiving the service guide comprises receiving the service guide based on session description data that is mapped between the first and second broadcast/multicast systems.

7. The method of claim 1, wherein the second broadcast/multicast system offers one or more advanced service functionalities that are absent from the first broadcast/multicast system, and the one or more advanced service functionalities include at least one of an interactive service, location based broadcasting, and purchase and payment information on service or content, the information of at least one of the one or more advanced service functionalities includes information for access the at least one of the one or more advanced service functionalities, and the information for access includes at least one of an IP address, a port number, and session description data given to the program that contains the enveloped at least a portion of the service guide of the second broadcast/multicast system.

8. A non-transitory computer-readable storage medium carrying one or more sequences of one or more instructions which, when executed by one or more processors, cause an apparatus to perform at least the following:
 subscribing to a service in a first broadcast/multicast system, comprising a Broadcast and Multicast System (BCMCS);
 transmitting a request for a service guide of a second broadcast/multicast system, comprising an open mobile alliance broadcast service (OMA BCAST), via an adaptation function between the first broadcast/multicast system and the second broadcast/multicast system, the first broadcast/multicast system being different from the second broadcast/multicast system;
 receiving at least a portion of the service guide of the second broadcast/multicast system as an enveloped content item within a program of a service guide of the first broadcast/multicast system via the adaptation function; and
 displaying the at least a portion of the service guide of the second broadcast/multicast system received via the first broadcast/multicast system.

9. The non-transitory computer-readable storage medium of claim 8, wherein the apparatus is caused to further perform:
 requesting a broadcast service of the second broadcast/multicast system from the service guide via the adaptation function.

10. The non-transitory computer-readable storage medium of claim 9, wherein the apparatus is caused to further perform:
 receiving a subscription to the requested broadcast service via the adaptation function.

11. The non-transitory computer-readable storage medium of claim 9, wherein the apparatus is caused to further perform:
 receiving the broadcast service enveloped within another program of the first broadcast/multicast system via the adaptation function.

12. The non-transitory computer-readable storage medium of claim 11, wherein the broadcast service is received with content of the second broadcast/multicast system inside the same channel as the program of the first broadcast/multicast system proxied behind one access.

13. An apparatus comprising:
    at least one processor; and
    at least one memory including computer program code, wherein the at least one memory and the computer program code configured to, with the at least one processor, cause the apparatus to perform at least the following:
        execute an adaptation function between a first broadcast/multicast system, comprising a Broadcast and Multicast System (BCMCS), and a second broadcast/multicast system, comprising an open mobile alliance broadcast service (OMA BCAST), the first broadcast/multicast system being different from the second broadcast/multicast system, by enveloping at least a portion of a service guide of the second broadcast/multicast system, within a program of a service guide of the first broadcast/multicast system.

14. The apparatus of claim 13, wherein the apparatus is further caused to: receive a broadcast service of the second broadcast/multicast system from the service guide via the adaptation function.

15. The apparatus of claim 14, wherein the apparatus is further caused to: receive a subscription to requested broadcast service via the adaptation function.

16. The apparatus of claim 14, wherein the apparatus is further caused to: envelop the broadcast service within another program of the first broadcast/multicast system.

17. The apparatus of claim 16, wherein the apparatus is further caused to: envelop content of the second broadcast/multicast system inside the same channel as the program of the first broadcast/multicast system proxied behind one access.

18. The apparatus of claim 13, wherein the apparatus is further caused to: map session description data between the first and second broadcast/multicast systems.

19. An apparatus comprising:
    at least one processor; and
    at least one memory including computer program code, wherein the at least one memory and the computer program code configured to, with the at least one processor, cause the apparatus to perform at least the following:
        receive a subscription message indicative of a subscription by a mobile terminal to a service in a first broadcast/multicast system, comprising a Broadcast and Multicast System (BCMCS);
        receive a request of the mobile terminal for a service guide of a second broadcast/multicast system, comprising an open mobile alliance broadcast service (OMA BCAST), via an adaptation function between the first broadcast/multicast system and the second broadcast/multicast system, the first broadcast/multicast system being different from the second broadcast/multicast system;
        communicate the request to the second broadcast/multicast system; and
        envelop at least a portion of a service guide of the second broadcast/multicast system within a program of a service guide of the first broadcast/multicast system.

20. An apparatus comprising:
    at least one processor; and
    at least one memory including computer program code, wherein the at least one memory and the computer program code configured to, with the at least one processor, cause the apparatus to perform at least the following:
        subscribe to a service in a first broadcast/multicast system, comprising a Broadcast and Multicast System (BCMCS);
        transmit a request for a service guide of a second broadcast/multicast system, comprising an open mobile alliance broadcast service (OMA BCAST), via an adaptation function between the first broadcast/multicast system and the second broadcast/multicast system, the first broadcast/multicast system being different from the second broadcast/multicast system;
        receive at least a portion of the service guide of the second broadcast/multicast system as an enveloped content item within a program of a service guide of the first broadcast/multicast system via the adaptation function; and
        display the at least a portion of the service guide of the second broadcast/multicast system received via the first broadcast/multicast system.

21. A method comprising:
    performing an adaptation function between a first broadcast/multicast system, comprising a Broadcast and Multicast System (BCMCS), and a second broadcast/multicast system, comprising an open mobile alliance broadcast service (OMA BCAST), the first broadcast/multicast system being different from the second broadcast/multicast system, by enveloping at least a portion of a service guide of the second broadcast/multicast system, within a program of a service guide of the first broadcast/multicast system.

22. A method comprising:
    causing, at least in part, reception of a subscription message indicative of a subscription by a mobile terminal to a service in a first broadcast/multicast system, comprising a Broadcast and Multicast System (BCMCS);
    causing, at least in part, reception of a request of the mobile terminal for a service guide of a second broadcast/multicast system, comprising an open mobile alliance broadcast service (OMA BCAST), via an adaptation function between the first broadcast/multicast system and the second broadcast/multicast system, the first broadcast/multicast system being different from the second broadcast/multicast system;
    communicating the request to the second broadcast/multicast system; and
    enveloping at least a portion of a service guide of the second broadcast/multicast system, within a program of a service guide of the first broadcast/multicast system.

23. A non-transitory computer-readable storage medium carrying one or more sequences of one or more instructions which, when executed by one or more processors, cause an apparatus to perform at least the following:
    receiving a subscription message indicative of a subscription by a mobile terminal to a service in a first broadcast/multicast system, comprising a Broadcast and Multicast System (BCMCS);
    receiving a request of the mobile terminal for a service guide of a second broadcast/multicast system, comprising an open mobile alliance broadcast service (OMA BCAST), via an adaptation function between the first broadcast/multicast system and the second broadcast/multicast system, the first broadcast/multicast system being different from the second broadcast/multicast system;
    communicating request to the second broadcast/multicast system; and
    enveloping at least a portion of a service guide of the second broadcast/multicast system, within a program of a service guide of the first broadcast/multicast system.

* * * * *